(12) United States Patent
Erikson et al.

(10) Patent No.: US 7,891,265 B2
(45) Date of Patent: Feb. 22, 2011

(54) MOTOR ASSEMBLY WITH ANTI-BACKLASH NUT AND THERMAL INSENSITIVE MECHANISM

(75) Inventors: Kenneth W. Erikson, Amherst, NH (US); Keith W. Erikson, Hollis, NH (US)

(73) Assignee: Haydon Kerk Motion Solutions, Inc., Waterbury, CT (US)

( * ) Notice: Subject to any disclaimer, the term of this patent is extended or adjusted under 35 U.S.C. 154(b) by 811 days.

(21) Appl. No.: 11/600,596

(22) Filed: Nov. 16, 2006

(65) Prior Publication Data

US 2008/0115605 A1 May 22, 2008

(51) Int. Cl.
*F16H 55/18* (2006.01)
*F16H 25/24* (2006.01)

(52) U.S. Cl. .................. 74/441; 74/89.23; 74/89.34; 74/89.42; 74/424.72; 310/75 D; 310/80

(58) Field of Classification Search ............... 74/89.3, 74/89.34, 89.42, 424.72, 441, 89.23, 409, 74/440; 310/75 D, 80
See application file for complete search history.

(56) References Cited

U.S. PATENT DOCUMENTS

| | | | |
|---|---|---|---|
| 1,153,861 A | | 9/1915 | Dudley et al. |
| 2,690,682 A | | 10/1954 | Passman |
| 3,124,969 A | | 3/1964 | Grabowski et al. |
| 3,597,782 A | | 8/1971 | Quackenbush |
| 3,660,704 A | * | 5/1972 | Paine et al. ............ 310/80 |
| 4,131,031 A | | 12/1978 | Erikson et al. |
| 4,210,033 A | | 7/1980 | Erikson et al. |
| 4,249,426 A | | 2/1981 | Erikson et al. |
| 4,274,294 A | | 6/1981 | Siryj et al. |
| 4,353,264 A | | 10/1982 | Erikson et al. |

(Continued)

FOREIGN PATENT DOCUMENTS

EP 0 878 642 11/1998

(Continued)

*Primary Examiner*—Richard W Ridley
*Assistant Examiner*—Thomas Diaz
(74) *Attorney, Agent, or Firm*—Hamilton, Brook, Smith & Reynolds, P.C.

(57) ABSTRACT

A motorized anti-backlash linear actuator comprises a motor; a hollow shaft that is rotated about a central axis by the motor, an anti-backlash nut that is nested at least partially inside the hollow shaft; and an externally threaded rod or lead screw that engages with the anti-backlash nut such that the rotation of the hollow shaft and the nut imparts a linear motion to the rod that is substantially free of backlash. Nesting the anti-backlash nut at least partially within the hollow shaft provides greater stability to the actuator, and permits high speed operation. A mechanical element, such as a nut or a bushing, comprises a first cylindrical element comprising a first material; a second cylindrical element comprising a second material, the second cylindrical element having a different coefficient of thermal expansion relative to the first cylindrical element, the second cylindrical element being disposed inside of and in contact with the first cylindrical element; and at least one interlocking structure at an interface between the first cylindrical element and the second cylindrical element to prevent the second cylindrical element from separating from the first cylindrical element under thermal effects. The mechanical element can be a plastic nut secured to the interior of a hollow shaft of a motorized anti-backlash linear actuator.

15 Claims, 8 Drawing Sheets

U.S. PATENT DOCUMENTS

| | | | |
|---|---|---|---|
| 4,433,590 A | * | 2/1984 | Benoit et al. .................. 74/409 |
| RE31,713 E | | 10/1984 | Erikson et al. |
| 4,566,345 A | | 1/1986 | Erikson et al. |
| 4,593,572 A | | 6/1986 | Linley, Jr. |
| RE32,433 E | | 6/1987 | Erikson et al. |
| 4,751,411 A | * | 6/1988 | Fukaya et al. ............ 310/49.18 |
| 4,974,464 A | | 12/1990 | Erikson et al. |
| 5,027,671 A | | 7/1991 | Erikson et al. |
| 5,079,963 A | | 1/1992 | Yamamoto et al. |
| 5,601,372 A | | 2/1997 | Erikson et al. |
| 5,689,997 A | | 11/1997 | Schaller |
| 5,732,596 A | | 3/1998 | Erikson et al. |
| 5,852,949 A | | 12/1998 | Cartensen |
| 5,913,940 A | | 6/1999 | Erikson et al. |
| 5,913,941 A | | 6/1999 | Erikson et al. |
| 5,937,702 A | | 8/1999 | Erikson et al. |
| 6,041,671 A | | 3/2000 | Erikson et al. |
| 6,099,166 A | | 8/2000 | Erikson et al. |
| 6,117,249 A | | 9/2000 | Erikson et al. |
| 6,131,478 A | | 10/2000 | Erikson et al. |
| 6,142,032 A | * | 11/2000 | Creager ........................ 74/441 |
| 6,202,500 B1 | | 3/2001 | Erikson et al. |
| 6,240,798 B1 | | 6/2001 | Erikson et al. |
| 6,362,547 B1 | | 3/2002 | Peterson et al. |
| 6,415,673 B1 | | 7/2002 | Erikson et al. |
| 6,422,101 B2 | | 7/2002 | Erikson et al. |
| 6,467,362 B2 | | 10/2002 | Erikson et al. |
| 6,546,825 B1 | | 4/2003 | Kugle |
| 6,603,229 B1 | | 8/2003 | Toye, IV |
| 6,619,147 B1 | | 9/2003 | Kojima |
| 6,756,705 B2 | | 6/2004 | Pulford, Jr. |
| 6,774,517 B2 | | 8/2004 | Kowalski et al. |
| D497,620 S | | 10/2004 | Morton |
| 6,932,319 B2 | | 8/2005 | Kowalski |
| 7,337,690 B1 | | 3/2008 | Devenyi |
| 7,458,292 B2 | | 12/2008 | Scholz |
| 2002/0043880 A1 | * | 4/2002 | Suzuki et al. .................. 310/12 |
| 2002/0074866 A1 | | 6/2002 | Morishima et al. |
| 2004/0165796 A1 | | 8/2004 | Longhurst |
| 2005/0103138 A1 | | 5/2005 | Chen et al. |
| 2005/0178225 A1 | | 8/2005 | Erikson et al. |
| 2005/0252323 A1 | | 11/2005 | Hama |
| 2006/0207359 A1 | | 9/2006 | Kowalski |
| 2007/0214902 A1 | | 9/2007 | Wang |
| 2007/0222320 A1 | | 9/2007 | Kowalski |

FOREIGN PATENT DOCUMENTS

| | | |
|---|---|---|
| JP | 406341505 A | 12/1994 |
| JP | 410047451 A | 2/1998 |
| WO | WO 96/39590 | 12/1996 |

* cited by examiner

MOTOR ASSEMBLY WITH ANTI-BACKLASH NUT AND THERMAL INSENSITIVE MECHANISM

BACKGROUND

Anti-backlash nuts, per se, are commercially available today in many forms and sizes. One of their important uses is to drive an element of a machine in a linear path with accurate positional repeatability and constant drag torque control in both the forward and reverse directions. For example, data printers and XY tables, used as peripheral equipment in the computer industry, have such requirements. Generally speaking, the anti-backlash nut is a nonrotatable member physically attached to a machine element. It is driven linearly in both forward and reverse directions by the rotation of a lead screw to which it is threadably attached. Such anti-backlash mechanisms will be found in our earlier U.S. Pat. Nos. 4,131,031, 4,249,426 and RE 32,433. We have found that such mechanisms are ideal for the creation of anti-backlash linear motion, not of the nut, per se, but of the lead screw which heretofore drove the nut.

There are numerous requirements today for very accurate linear reciprocation, as for example, a piston of pumping mechanism for chemical or medical analysis apparatus. Accuracy is also required in raising and lowering of apparatus in a predictable and repeatable sequence in robotic applications.

One example of a motorized anti-backlash linear actuator is disclosed in the present inventors' U.S. Pat. No. 4,974,464. This patent describes an actuator having a motor in a casing and an anti-backlash nut extending out from the motor casing. In such a device, the motorized components can result in large temperature disparities between operating and non-operating conditions, which can have unpredictable consequences on the various components of the device, particularly if they have different thermal properties. Also, the fact that the anti-backlash nut extends a significant distance outside of the motor casing can make the device unstable, particularly when the anti-backlash nut is rotated at high speeds.

SUMMARY OF THE INVENTION

A motorized anti-backlash linear actuator comprises a motor; a hollow shaft that is rotated about a central axis by the motor, an anti-backlash nut that is nested at least partially inside the hollow shaft; and an externally threaded rod or lead screw that engages with the anti-backlash nut such that the rotation of the hollow shaft and the nut imparts a linear motion to the rod that is substantially free of backlash.

The motor and hollow shaft are preferably housed in a stationary motor housing. The hollow shaft and the anti-backlash nut rotate together with respect to the motor housing. The rod reciprocates linearly, but does not rotate. In a preferred embodiment, the anti-backlash mechanism comprises a first, movable nut that is at least partially nested inside the hollow shaft and a second, fixed nut located inside the hollow shaft. The fixed nut can comprise a plastic material secured to the interior of the shaft. The hollow shaft is preferably aluminum, bronze, brass or another metal material. The first and second nuts can be made of an injection moldable thermoplastic.

The moveable nut is housed within the hollow shaft such that the nut can move axially within the shaft but cannot rotate independently of the shaft. In one embodiment, the shaft comprises an interior splined surface and the movable nut comprises a plurality of grooves that mate with the splined surface of the shaft. The linear actuator comprises a mechanism that biases the fixed and movable nuts in an axial direction to maintain intimate contact between the threads of the nuts and the threads of the rod. This reduces backlash between the nut and the rod as the nut rotates.

The mechanism for reducing backlash between the nut and the rod preferably includes a torsion spring. In certain embodiments, the movable nut comprises a cylindrical portion containing both the internal threads that engage with the rod, and external threads that contact an internally-threaded collar. The torsion spring is disposed over the cylindrical portion of the movable nut, and extends between a first end of the movable nut and the collar. The collar is biased by the torsion spring to rotate on the external threads of the cylindrical portion of the movable nut, and this rotation forces the internal threads of the movable nut into contact with the threads of the rod to reduce backlash.

The movable nut can comprise a mechanism for adjusting the amount of drag torque between the nut and the rod, such as an adjustment ring on the nut for varying the torsional bias between the nut and the collar.

An advantage of the present invention is that by having at least a portion of the anti-backlash nut nested within the motor housing, the profile and mass moment of inertia of the anti-backlash nut is reduced compared to, for example, the embodiments described in U.S. Pat. No. 4,974,464. The linear actuator with an anti-backlash nut is therefore characterized by greater stability during operation, even when the motor is operated at high speeds. Another advantage over the embodiments of U.S. Pat. No. 4,974,464 is that spring torque adjustments are readily accessible.

In another aspect of the invention, a mechanical element, such as a nut or a bushing, comprises a first cylindrical element comprising a first material; a second cylindrical element comprising a second material, the second cylindrical element having a different coefficient of thermal expansion relative to the first cylindrical element, the second cylindrical element being disposed inside of and in contact with the first cylindrical element; and at least one interlocking structure at an interface between the first cylindrical element and the second cylindrical element to prevent the second cylindrical element from separating from the first cylindrical element under thermal effects. The first cylindrical element can comprise a metal material, and the second cylindrical element can comprise a plastic material, for example.

The interlocking structure can comprise a re-entrant portion of the first cylindrical element that mates with the outer surface of the second cylindrical element. In one embodiment, the interlocking structure comprises a plurality of dovetail joints around the interface of the first and second cylindrical elements. The interlocking structures lock the interior cylindrical element to the outer housing, and prevents the inner cylindrical element from shrinking away and separating from the outer cylinder. This is particularly advantageous, for example, in the context of a motorized linear actuator, where the outer cylindrical element comprises a hollow metal tube, and the interior cylindrical element comprises an internally threaded plastic nut. The structure is preferably formed by an injection molding process.

In another aspect, a motorized linear actuator comprises a motor; a hollow shaft that is rotated about a central axis by the motor, at least a portion of the hollow shaft comprising an internally threaded surface; a rod having external threads, the threaded portion of the hollow shaft engaging the threads of the rod, such that the rotation of the hollow shaft imparts a linear motion to the rod relative to the hollow shaft; and a motor housing that contains the motor and the hollow shaft such that axial motor play is substantially eliminated.

The above and other features of the invention including various novel details of construction and combinations of parts will now be more particularly described with reference to the accompanying drawings and pointed out in the claims. It will be understood that the particular motorized anti-backlash linear actuator embodying the invention is shown by way of illustration only and not as a limitation of the invention. The principles and features of this invention may be employed in varied and numerous embodiments without departing from the scope of the invention.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of preferred embodiments of the invention follows.

Figure 1:
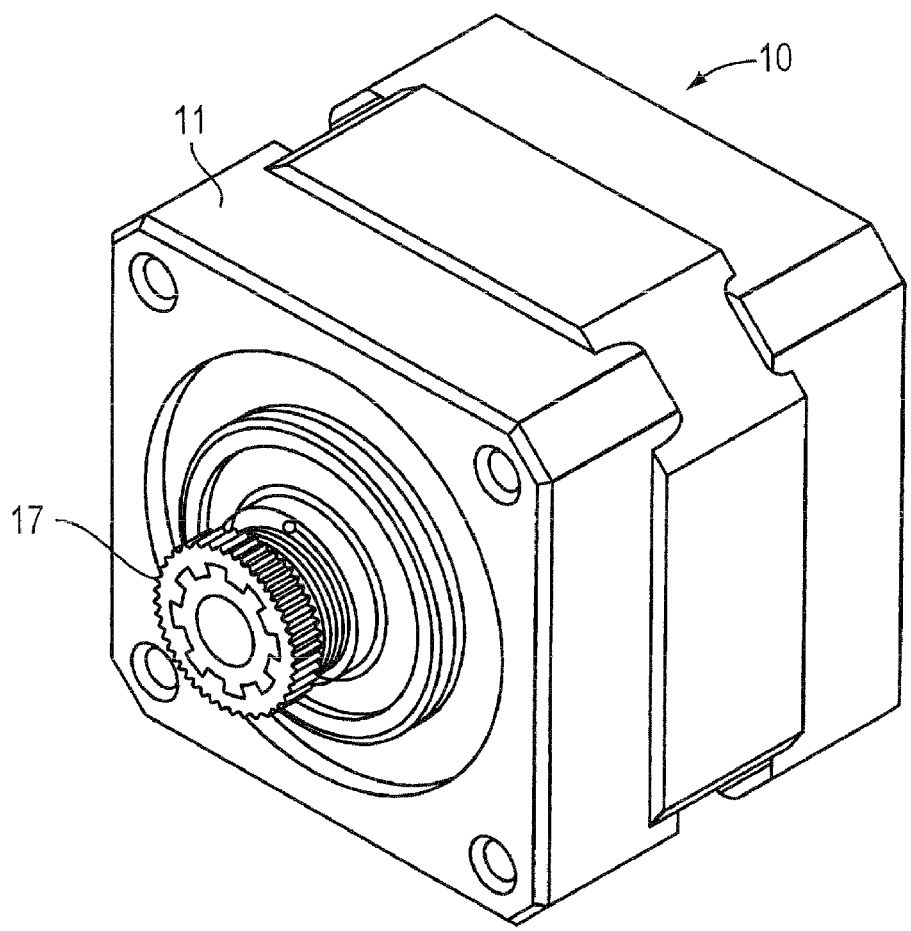
FIG. 1 is a front perspective view of a motorized anti-backlash linear actuator in accordance with one aspect of the invention.
Figure 2:
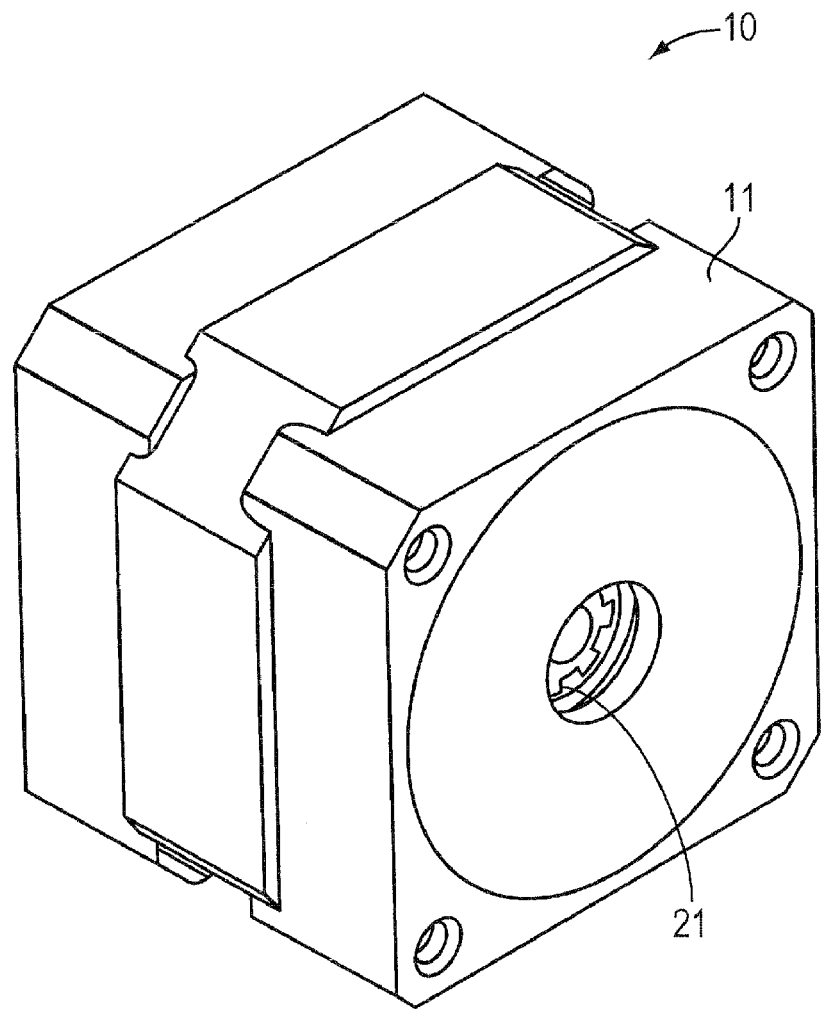
FIG. 2 is a rear perspective view of the motorized anti-backlash linear actuator of FIG. 1.
Figure 3:
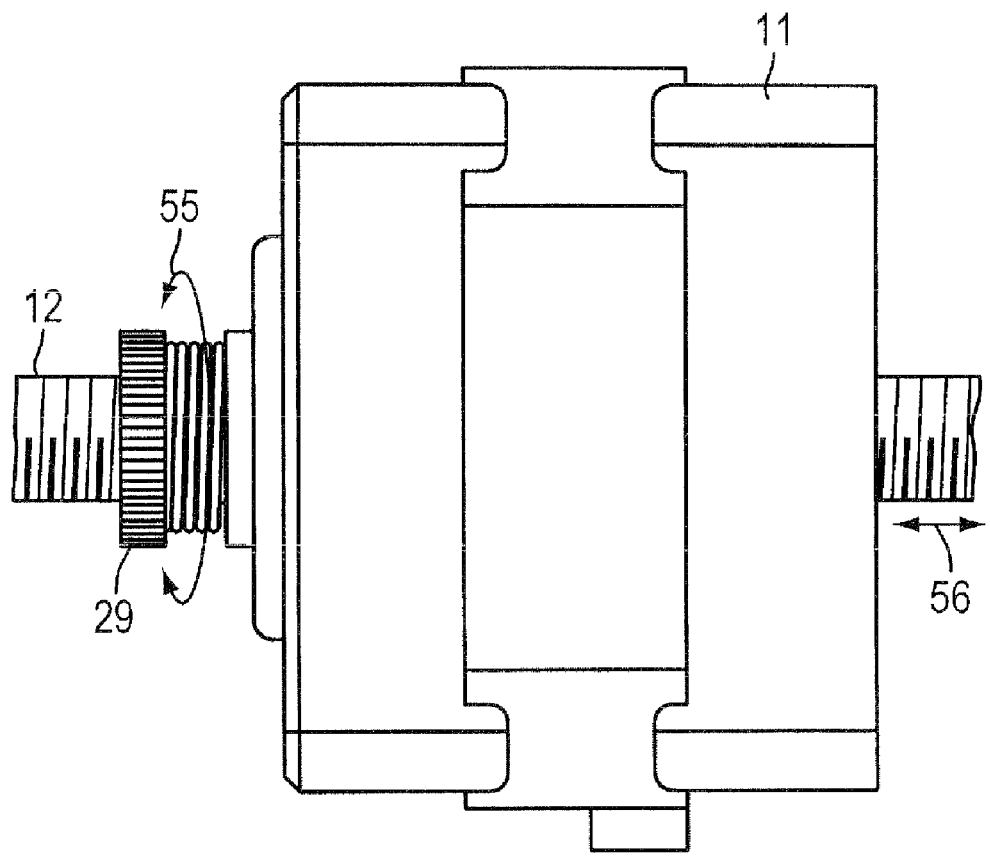
FIG. 3 is a side view of a motorized anti-backlash linear actuator and lead screw assembly.

FIGS. 1 and 2 shows a motorized linear actuator in accordance with one aspect of the invention. The actuator comprises a motor assembly 10 having a motor housing 11, a first nut 17 on one end of the housing 11, and a second nut 21 on the opposite end of the housing 11. The nuts 17 and 21 are internally threaded and configured to mate with a lead screw 12 having threads extending along the length of the screw, as is shown in FIG. 3.

In a preferred embodiment, moveable nut 17 comprises an anti-backlash biasing mechanism, and nut 21 comprises a fixed non-anti-backlash nut.

Figure 4:
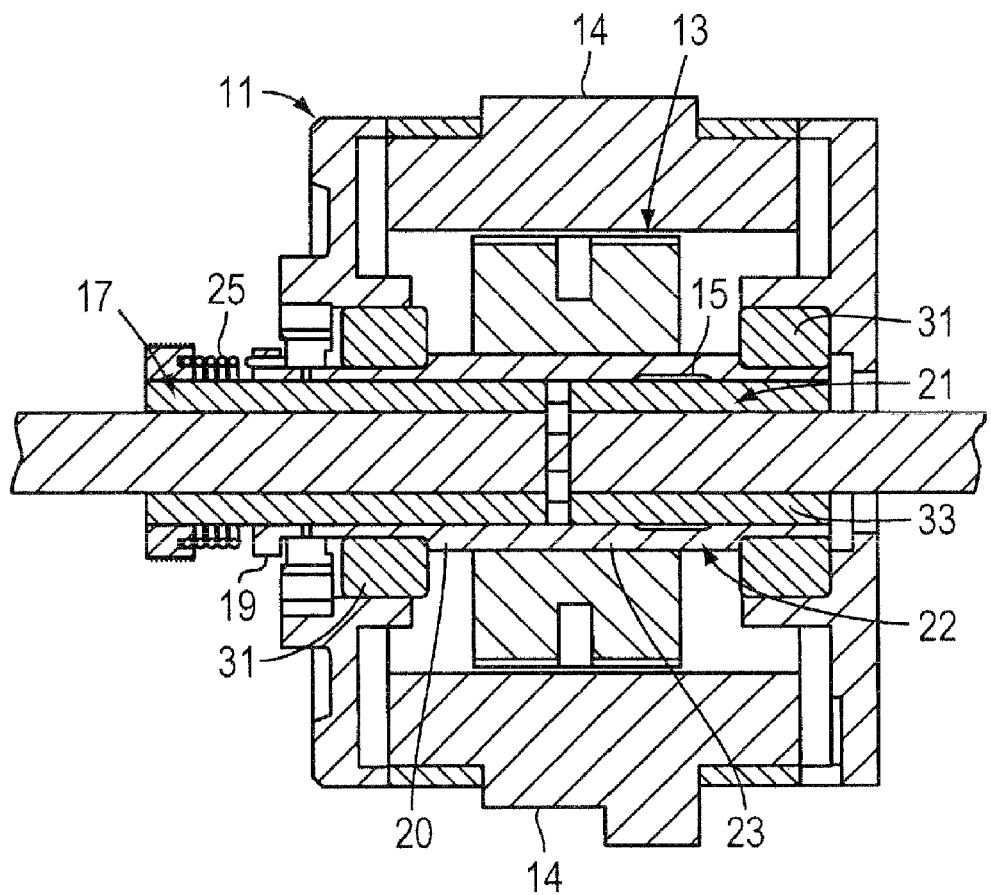
FIG. 4 is a cross-sectional side view of the assembly of FIG. 3.

As shown in FIG. 4, the motor housing 11 includes a drive mechanism that imparts a rotary motion to nut 17 and nut 21 relative to the housing, in the direction of arrow 55. The threads of nuts 17, 21 engage the threads of lead screw 12, so that the rotation of the nuts causes a translation of the screw 12 relative to the housing 11 in the direction of arrow 56. Thus, the controlled rotational movement of the nuts 17, 21 by the motor results in a controlled linear reciprocation of the lead screw 12. The lead screw 12 is preferably attached to a load (not show), and the actuator 10 can precisely control the linear motion and position of the load. Examples of a motor assembly for imparting linear motion to a lead screw are described in U.S. Pat. No. 4,974,464 to Erikson et al., the entire teachings of which are incorporated herein by reference.

A linear actuator 10 according to one embodiment is shown in the cross-sectional side view of FIG. 4. In this embodiment, the drive mechanism comprises one or more stationary field coils 14 that rotate a rotor 13 within the motor housing 11. The rotor 13 is connected to, and rotates, a hollow tube 15 on bearings 31.

The hollow tube 15 is preferably made of a metal material, such as brass or stainless steel, and comprises a first portion 20, a second portion 22, and optionally a third portion 23. The second portion 22 of the tube 15 includes an internal surface, and comprises the fixed second nut 21. The second portion 22 can comprise, for example, a plastic material secured to the interior surface of the hollow tube 15, and having internal threads that engage with the threaded outer surface of the lead screw 12.

The first portion 20 of hollow tube 15 houses the movable nut 17. The moveable nut 17 is nested within the first portion of the tube so that the nut 17 is able to move axially relative to the tube 15, but cannot rotate relative to the tube, as is described in further detail below.

The third portion 23 of the tube comprises the middle portion of the tube and is fixed to a rotor.

Figure 5:
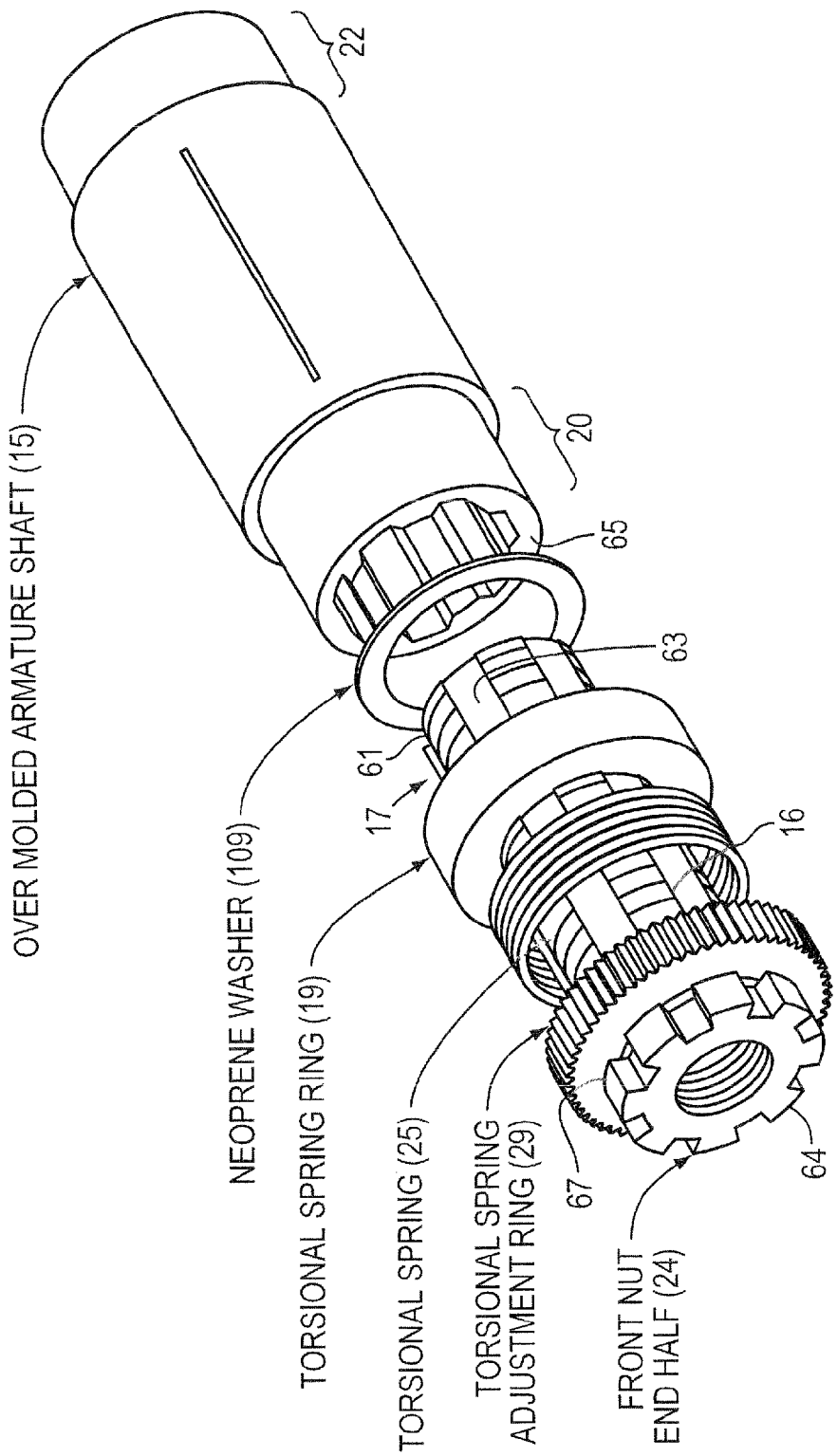
FIG. 5 is an exploded front perspective view of an anti-backlash nut and rotating hollow tube.
Figure 6:
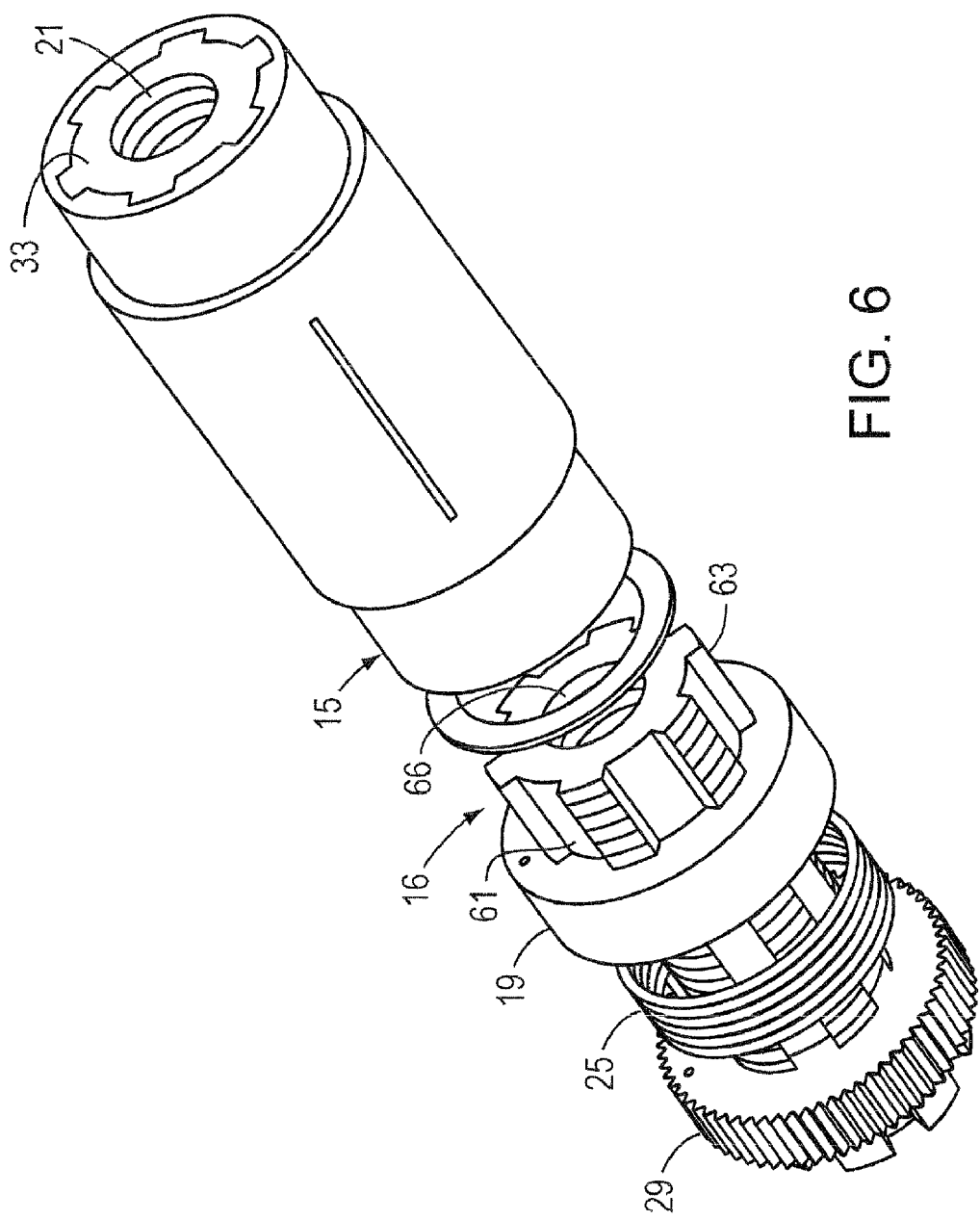
FIG. 6 is an exploded rear perspective view of the anti-backlash nut and rotating hollow tube of FIG. 5.

Turning now to FIGS. 5 and 6, the anti-backlash nut mechanism and rotating hollow tube 15 are shown in front and rear exploded perspective views. As can be seen in FIG. 5, the movable nut 17 comprises a tubular portion 16, an adjustment ring 29, a collar 19 and a torsion spring 25. The tubular portion 16 of the nut 17 comprises a threaded external surface 61 and a series of evenly-spaced grooves 63 around the outer circumference of the tubular portion 16. The threaded external surface 61 and the grooves extend along the length of the nut and terminate at a shoulder portion 24 at the face of the nut, which has a series of evenly-spaced teeth 64 around the outer circumference of the shoulder 24. The movable nut 17 has a hollow interior having internal threads 66 for engaging with a threaded lead screw. The movable nut 17 can comprise a plastic material.

The movable nut 17 is at least partially housed within the first portion 20 of the hollow tube. The first portion 20 of the hollow tube 15 includes a series of evenly-spaced splines 65 that are configured to mate with the grooves 63 on the surface of the nut 17. In this way, the nut 17 is permitted to move in an axial direction, in-and-out of the hollow tube 15, but the nut 17 is not permitted to rotate with respect to the tube 15. Thus, as the hollow tube 15 rotates within the motor housing 11, the anti-backlash nut is forced to rotate simultaneously.

The splines 65 on the hollow tube 15 and the mating grooves on the nut 17 can have any profile (e.g., quadrangular, triangular, etc.), and in a preferred embodiment, the splines and grooves have a dovetail profile.

In operation, as shown in FIG. 4, the movable nut portion 17 of the anti-backlash mechanism is partially nested within the hollow tube 15. As previously discussed, the nut 17 can slide axially within the tube 15, but cannot rotate independently of the tube 15. Collar 19 contains internal threads, and is threaded over the threaded external surface 61 of the nut 17. The collar 19 has a larger diameter than the diameter of the tube 15. The collar 19 acts as a stop, defining the distance between the end of the hollow tube 15 and the face of the nut 17. By rotating the threaded collar 19 on the nut 17, the lateral separation between the face of the nut 17 and the hollow tube 15 is adjusted.

The torsion spring 25 is disposed over the nut 17 between the shoulder 23 of the nut and the collar 19. The torsion spring 25 is secured at one end to the collar 19. In the embodiment shown in FIGS. 5 and 6, the torsion spring 25 is secured to an adjustment ring 29. The adjustment ring 29 has a series of evenly-spaced notches 67 around its inner circumference, which mate with the teeth 64 on the shoulder 24 of the nut 17. In other embodiments, the torsion spring 25 can be secured directly to nut 17, such as to the shoulder 24.

Referring now to FIG. 4, the operation of the linear actuator 10 with an anti-backlash mechanism is described. The lead screw 12 extends through the hollow tube 15 of the actuator. Nut 21 and nut 17 include internally threaded surfaces that engage with the threads on the lead screw 12. Collar 19 is biased by torsion spring 25 to rotate on the threaded outer surface of the nut 17. The collar 19 is forced against the end of the hollow tube 15, which prevents the collar from moving axially. Preferably, a neoprene washer 109 is located between the collar 19 and the end of the tube 15. The rotation of the collar 19 on the threaded outer surface of the nut 17 forces the nut 17 to move in an axial direction away from the hollow tube 15 and nut 21. The threads of the nut 17 are thus biased against the mating threads of the lead screw 12, and away from the threads of the fixed nut 21 in the hollow tube 15, thus taking up any backlash or slack as the lead screw reciprocates with respect to the motor assembly 10. The collar 19 will continue to rotate on the threaded outer surface of the nut 17 as the interior threads of the nut wear down over time. Thus, the anti-backlash mechanism is able to compensate for wear and maintain intimate contact between the threads of the nut and the threads of the lead screw 12.

In the embodiment shown in Figs, 5 and 6, the amount of torque and resulting drag of the anti-backlash bias can be controlled by the adjustment ring 29. As shown in FIG. 5, rotating the notches 67 of the adjustment ring 29 to different teeth 64 on the shoulder 24 of the nut will alter the torsional bias force between the collar 19 and the nut portion 17, and can therefore be used to modify the drag force between the threads of the nut and the threads of the lead screw.

In the embodiments shown and described, it will be apparent that at least a portion of the anti-backlash nut 17 is nested within the motor housing 11. In this way, the profile and inertia of the anti-backlash nut is reduced compared to, for example, the embodiments described in U.S. Pat. No. 4,974,464. Consequently, the present motorized linear actuator with an anti-backlash nut is characterized by greater stability during operation, even when the motor is operated at high speeds.

Figure 7:
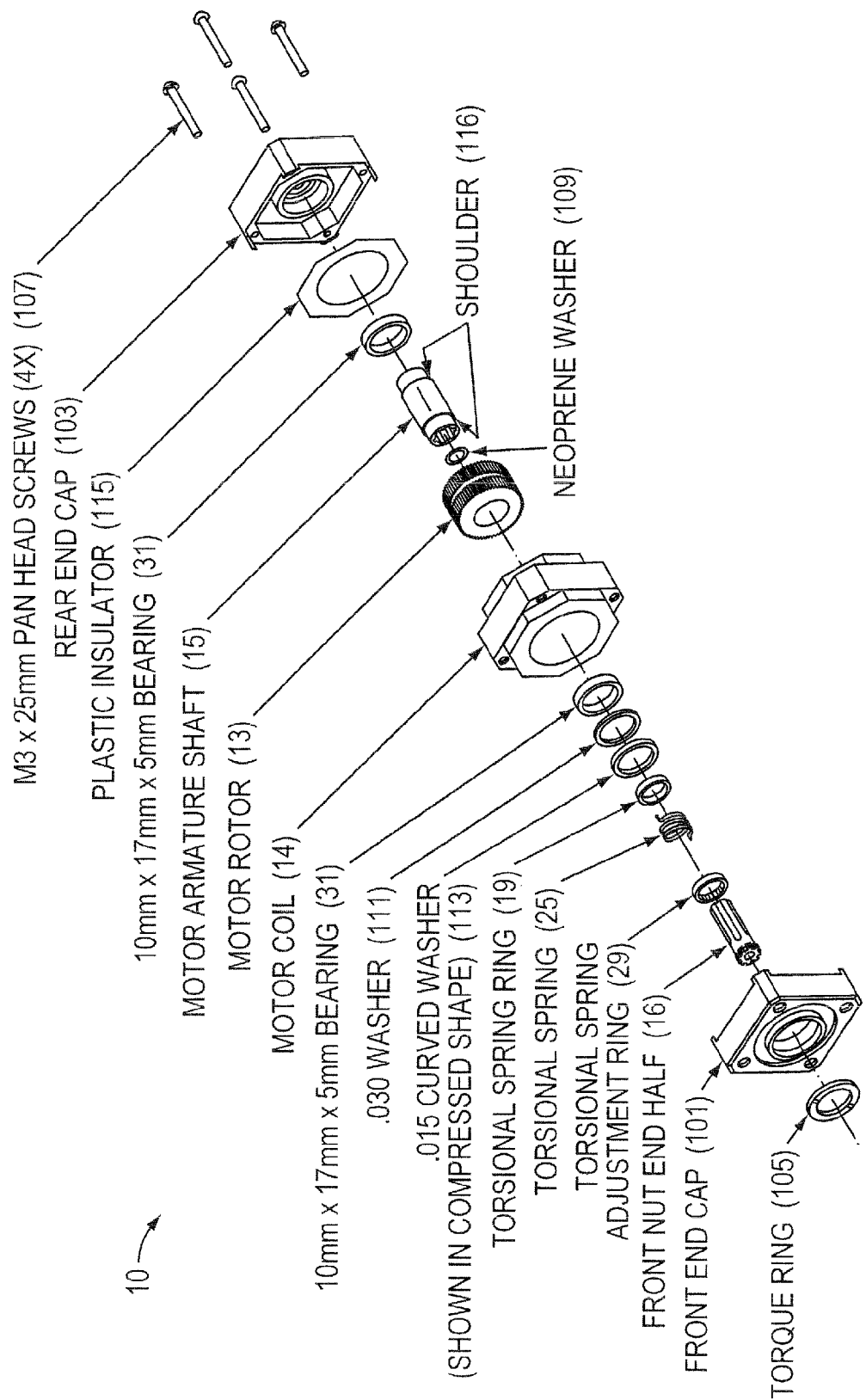
FIG. 7 illustrates the components of a motorized anti-backlash linear actuator in accordance with one embodiment of the invention.

An embodiment of a linear actuator according to one aspect of the invention is shown in exploded view in FIG. 7. In addition to the components previously described, this embodiment also illustrates one example of a suitable motor assembly 10, including motor coil 14, rotor 13, front end cap 101, rear end cap 103, torque ring 105, washer 111, curved washer 113 and fastening screws 107. The motor assembly 10 can also include insulating material, such as the plastic insulator 115 between the motor coil 13 and the end cap 103. An advantage of this embodiment is that the motor assembly is designed to minimize internal axial motor play. The bearings 31 are held solid against the hollow tube 15 which serves as the motor shaft. As is shown in FIG. 7, the rear bearing 31 is fixed between the rear end cap 103 and a rear shoulder 116 on the hollow tube 15. The front bearing 31 is held between the front shoulder 116 of the hollow tube 15 and the torque ring 105. A 0.030 washer 111 and a curved 0.015 spring washer 113 are located between the bearing 31 and the torque ring 105. The torque ring 105 is mounted within the front end cap 105, and can be tightened to substantially eliminate axial play of the hollow tube 15 and rotor 13 as the motor operates. The curved washer 113 is preferably maintained in a compressed shape, as shown in FIG. 7. In this way, if any gap develops between the components of the motor assembly (i.e. the torque ring 105, bearings 31, hollow tube 15 and rear end cap 103), such as from thermal effects, the curved washer 113 will become sufficiently uncompressed to take up any slack that develops in the motor assembly.

Turning now to FIG. 6, the motorized linear actuator is shown in a rear view, which illustrates a thermally-insensitive nut 21. As previously mentioned, the hollow tube 15 that rotates within the motor housing 11 is generally made from a metal material, such as aluminum or brass. The nut 21 that is secured to the interior of the tube 15 is made from a plastic material, such as an injection moldable thermoplastic. The expansion coefficient of plastic is generally higher than that of a metal, such as aluminum or brass, so that with changes of temperature, the plastic nut 21 expands and shrinks at a different rate than does the metal tube 15 surrounding the nut. Both the outer diameter of the plastic nut and the inner diameter of the metal tube to which the nut is attached vary by an amount proportional to the thermal expansion coefficient ($\alpha$) of each material multiplied by the change in temperature ($\Delta T$). Since the plastic material of the nut has a larger thermal expansion coefficient, it is more sensitive to temperature change than the metal tube that surrounds it. Under cooler temperature conditions, the plastic nut 21 will shrink more than the metal tube 15, which can result in a gap forming between the nut and the tube, and can ultimately cause the nut to become dislodged from the tube and tighten around the lead screw.

Figure 8:
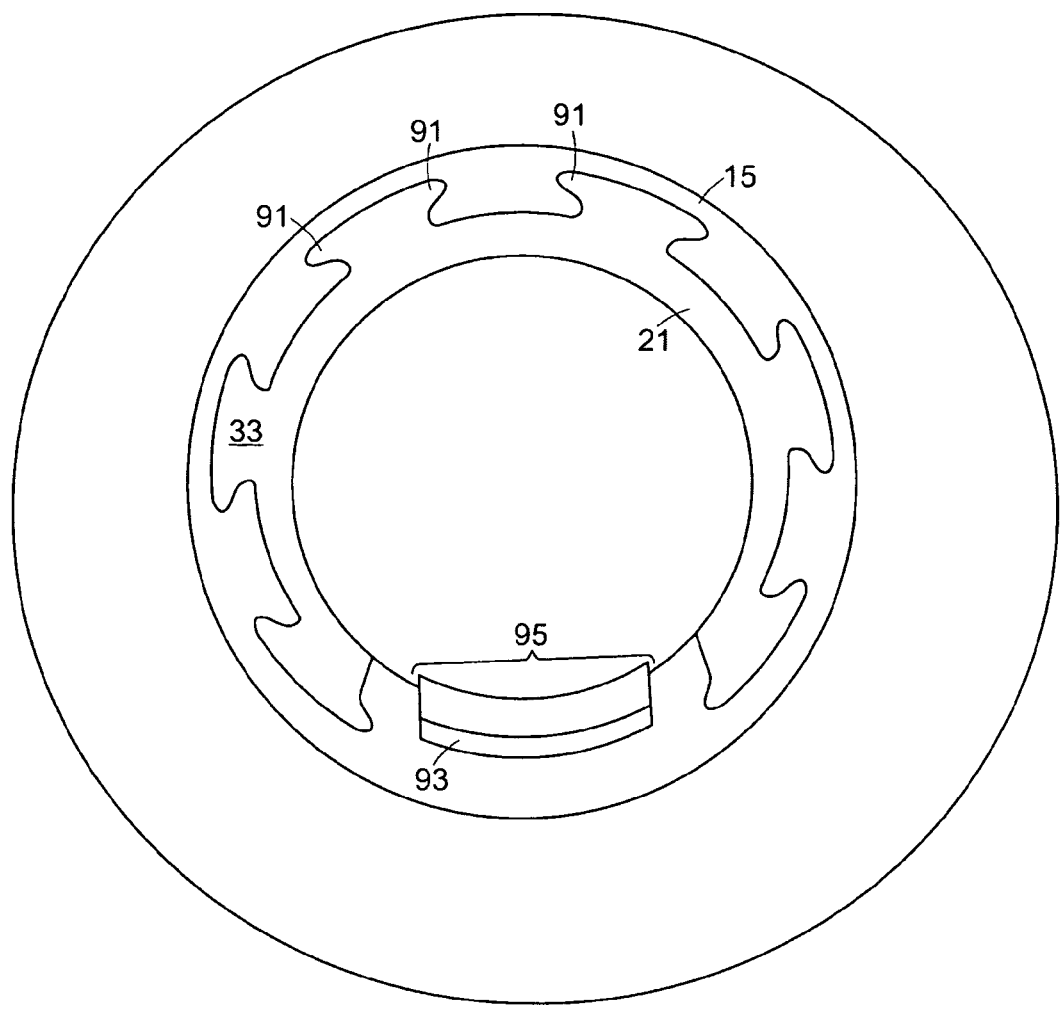
FIG. 8 is a cross-sectional view of a bushing using materials with dissimilar thermal properties in accordance with one aspect of the invention.

In one aspect, the present invention relates to a design for a nut or bushing that overcomes these limitations. For example, in the cross-sectional view of a plastic nut 21 and hollow tube 15 shown in FIG. 8, the interface between the nut 21 and the tube 15 includes a plurality of interlocking structures 91. In the embodiment shown in FIG. 8, the interlocking structures 91 comprise a plurality of evenly-spaced dovetail joints between the nut 21 and the tube 15. Even when plastic nut 21 shrinks at a faster rate than the outer metal tube 15 due to thermal expansion effects, the interlocking dovetail joint will hold the nut in position within the tube. Preferably, the interlocking structure(s) 91 extend around the entire interface between the inner and outer cylinders. In the embodiment of FIG. 8, the dovetail structures do not extend completely around the interface, as a portion 95 of the interface has been left without any interlocking structures to illustrate the gap 93 that can form between the nut and tube due to thermal effects.

The interlocking structures 91 are configured to hold the plastic nut 21 in place within the metal tube 15, and render the device largely insensitive to changes in temperature and differential thermal expansion effects. Outer cylinder includes a re-entrant portion that mates with the outer surface of the inner cylinder. In the embodiment shown, the interlocking structures comprise a dovetail joint, though it will be understood that other similar interlocking structures could be used, such as a "T"-shaped joint, an "L"-shaped joint, or a rounded or ball-shaped joint.

Although the embodiments illustrated herein relate to a threaded nut, it will be understood that the principles of the invention equally apply to unthreaded elements, such as a bushing, within a cylindrical outer tube, where the bushing and outer tube have dissimilar thermal properties.

In one embodiment, the interlocking structures are produced by forming a series of evenly-spaced trapezoidal splines that extend along the length of the hollow tube 15. These splines can advantageously comprise the same splines 65 at the first portion 20 of the tube 15 that mate with the grooves 63 on the anti-backlash nut 17. The second, non-anti-backlash nut 21 can be formed by injection molding a plastic material directly into the second portion of the metal tube 15 (i.e. on the opposite end from the movable nut 17).

While this invention has been particularly shown and described with references to preferred embodiments thereof, it will be understood by those skilled in the art that various changes in form and details may be made therein without departing from the scope of the invention encompassed by the appended claims.

What is claimed is:

1. A motorized anti-backlash linear actuator, comprising:
a motor;
a hollow shaft that is rotated about a central axis by the motor, at least a portion of the hollow shaft comprising an internally threaded surface;
an anti-backlash nut having an internally threaded portion, at least a portion of the anti-backlash nut being nested inside the hollow shaft, the anti-backlash nut configured for rotating with the hollow shaft while being permitted to slide axially within the hollow shaft; and
a rod having external threads, the threaded portion of the hollow shaft and the threaded portion of the anti-backlash nut engaging the threads of the rod, such that the rotation of the hollow shaft and the anti-backlash nut imparts a linear motion to the rod relative to the hollow shaft and the anti-backlash nut, said linear motion being substantially backlash-free, a mechanical stop threadably mounted around the anti-backlash nut engages an axial end of the hollow shaft defining a distance between the end of the hollow shaft and a face of the anti-backlash nut, the stop being connected to a rotationally resilient member for rotationally biasing the stop to be self adjusting to axially force the anti-backlash nut away from the threaded portion of the hollow shaft to take up backlash.

2. The motorized anti-backlash linear actuator of claim 1, further comprising a motor housing, the motor housing containing the motor, the hollow shaft and at least a portion of the anti-backlash nut, the motor housing remaining stationary relative to the rotation of the hollow shaft and anti-backlash nut and the linear translation of the rod.

3. The motorized anti-backlash linear actuator of claim 2, wherein internal axial motor play is substantially eliminated.

4. The motorized anti-backlash linear actuator of claim 1, wherein the rod does not rotate.

5. The motorized anti-backlash linear actuator of claim 1, wherein the rod comprises a lead screw.

6. The motorized anti-backlash linear actuator of claim 1, wherein the portion of the hollow shaft comprising an internally threaded surface comprises a second nut.

7. The motorized anti-backlash linear actuator of claim 6, wherein the second nut is a non-anti-backlash nut.

8. The motorized anti-backlash linear actuator of claim 7, wherein the second nut is disposed at an opposite end of the hollow tube to the anti-backlash nut.

9. The motorized anti-backlash linear actuator of claim 1, further comprising:
means for biasing the threads of the anti-backlash nut into contact with the threads of the rod to reduce backlash between the nut and the rod as the nut rotates.

10. The motorized anti-backlash linear actuator of claim 9, wherein the means for biasing comprises a torsion spring.

11. The motorized anti-backlash linear actuator of claim 10, wherein the anti-backlash nut comprises a cylindrical portion having internal threads contacting the rod, and external threads contacting a collar, the torsion spring being disposed over the cylindrical portion of the anti-backlash nut, and extending between a first end of the anti-backlash nut and the collar.

12. The motorized anti-backlash linear actuator of claim 11, wherein the collar is biased by the torsion spring to rotate on the external threads of the cylindrical portion of the anti-backlash nut, said rotation forcing the internal threads of the anti-backlash nut into contact with the threads of the rod to reduce backlash.

13. The motorized anti-backlash linear actuator of claim 12, further comprising means for adjusting the amount of drag torque between the nut and the rod.

14. The motorized anti-backlash linear actuator of claim 13, wherein the means for adjusting the amount of backlash reduction comprises an adjustment ring disposed at the first end of the anti-backlash nut, the torsion spring extending between the collar and the adjustment ring, the adjustment ring being rotatable with respect to the anti-backlash nut to adjust the torsional bias between the nut and the collar.

15. The motorized anti-backlash linear actuator of claim 11, wherein the cylindrical portion of the anti-backlash nut comprises at least one groove on the exterior surface of the cylindrical portion, and the hollow tube comprises at least one spline that mates with the at least one groove.

* * * * *